United States Patent [19]

Jánosi

[11] 4,456,935
[45] Jun. 26, 1984

[54] INFORMATION RECORDING APPARATUS WITH A DISC LOADED IN A CASSETTE

[75] Inventor: Marcell Jánosi, Budapest, Hungary

[73] Assignee: Budapesti Radiotechnikai Gyar, Hungary

[21] Appl. No.: 293,214

[22] PCT Filed: Aug. 5, 1980

[86] PCT No.: PCT/HU80/00001
§ 371 Date: Aug. 7, 1981
§ 102(e) Date: Aug. 7, 1981

[87] PCT Pub. No.: WO81/01906
PCT Pub. Date: Jul. 9, 1981

[30] Foreign Application Priority Data

Jul. 29, 1980 [HU] Hungary .............................. 1893/80

[51] Int. Cl.³ .............................................. G11B 5/82
[52] U.S. Cl. ...................................... 360/97; 360/99; 360/133
[58] Field of Search ...................... 360/81, 86, 97, 98, 360/99, 105, 106, 107, 132, 133, 135; 206/444

[56] References Cited

U.S. PATENT DOCUMENTS 4,131,199 12/1978 Hatchett et al. ..................... 206/444
4,138,703 2/1979 Stave et al. .......................... 360/133
4,320,430 3/1982 Vogt ................................... 360/133

Primary Examiner—Robert L. Richardson
Attorney, Agent, or Firm—McGlew and Tuttle

[57] ABSTRACT

An information recording apparatus with a disc loaded in an oblong-shaped cassette, in which the flexible information recording disc comprises a solid centering hub. The apparatus comprises a drive with a writing-reading head, a driving motor for rotating the disc and a guiding assembly for moving the head along a path. The cassette has an opening for the introduction of the head arranged in a corner region thereof, and the center point of the path of the head movement falls near to the longer side wall of the cassette that leads to the corner near to the opening. The head guiding is designed in such a way that during the head movement the relative position of the head and the information recording tracks on the disc is constant within a negligable range of tracking error.

24 Claims, 13 Drawing Figures

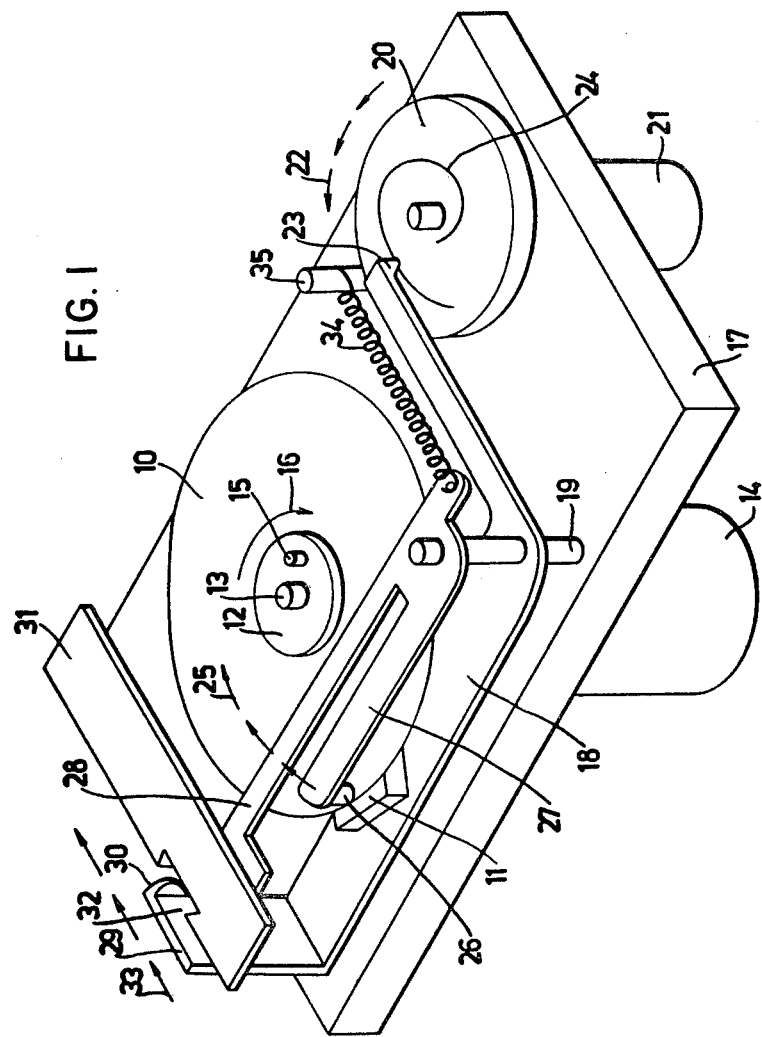

INFORMATION RECORDING APPARATUS WITH A DISC LOADED IN A CASSETTE

FIELD AND BACKGROUND OF THE INVENTION

The invention relates to an information recording apparatus with a disc loaded in a cassette which can be used mainly in the field of computing techniques as a background memory for smaller processors and terminals.

In the Hungarian Pat. No. 170,790 a cassette information recording apparatus is described that comprises a flexible circular disc provided with a solid centering hub which is loaded in a cassette. The magnetic disc is rotated at a predetermined speed and information is recorded on the rotating disc or information is read out therefrom. The information is recorded on concentric circular tracks of the disc. The apparatus comprises a drive unit, and the cassette can be inserted in the drive unit in which it takes a guided position, and the disc is rotated by a driving spindle driven by a motor located in the drive unit. In operation, the driving spindle is coupled to the hub of the flexible disc. A writing-reading head arranged in the drive unit can be inserted in the cassette to approach the information recording tracks through an opening defined in the base plate of the cassette.

The development of such a cassette information storage apparatus represented an advance compared to the conventionally used floppy and mini-floppy type of information storage equipment, because the rigid cassette provided a sufficient protection for the sensitive information recording disc. As is known, in floppy systems the flexible disc is protected by a comparatively thin cover of paper material, in which respective windows are made at both sides for receiving the recording head.

Owing to the introduction of the cassette technique which has information recording density values corresponding to those realisable in minifloppy techniques, the volume of the drive unit was reduced and the storage and the handling of the information recording disc became easier. According to the Hungarian Pat. No. 170,790 an oblong-shaped cassette defines an oblong-shaped opening for the introduction of the head and this opening is arranged in the center line of the disc near to a side wall of the cassette. In the drive unit according to that patent a head moving arm supports a plurality of writing-reading heads, and the heads are moved in a radial direction parallel to the smaller side wall of the cassette.

With such an arrangement of the head receiving opening the width of the cassette is rather high compared to the diameter of the information recording disc, because the cassette should have a sufficient wall thickness beyond the outer side of the opening to ensure sufficient rigidity for the cassette. The lateral size of the drive unit was also rather great compared to the diameter of the disc, due to the requirement of the head movement in a lateral direction.

During operation the other side of the disc, which is opposite to the side coupled to the writing-reading head, should be pressed according to the required head pressure. When both sides of the disk in the cassettes are used for information recording, then the pressure is made by the insertion of a second writing-reading head. When only one side of the disc is used for information recording, the head pressure is established by the application of a pad made generally by an appropriate felt material. For the insertion of the second head or of the pad, the upper side of the cassette comprises a window arranged in a position corresponding to that of the opening for the head.

The second head or the pad is arranged in the drive unit and it is moved exactly in the same way as the first head. Owing to this construction also the height of the drive unit will be relatively great.

In the widely used conventional information recording equipment, in which only one side of the disc is used, the wear of the pad in the drive unit was rather great, and for that reason the replacement of the pad was often required. This made the readjustment of the drive unit necessary.

Although the cited construction using the cassette could provide a better protection for the flexible disc than the conventional paper covers could, both surfaces of the flexible information recording disc were exposed to mechanical damage through the windows of the cover. Apart from the hazard of such damage the cassette surface was exposed to the effects of dust and dirt which became serious through extended storage periods.

The above problems, which are connected with the presence of the exposed disc surfaces through the openings, with the guiding of the head movement and with the appropriate head support, are present in the conventionally used floppy technique, too.

OBJECT OF THE INVENTION

The object of the present invention is to provide an information recording apparatus using a disc loaded in a cassette that can overcome the above summarized problems and can reduce the required size of the cassette and of the drive unit by an appropriate rearrangement of the opening for the head introduction.

SUMMARY OF THE INVENTION

According to the present invention an information recording apparatus has been designed with a disc loaded in a cassette, that comprises a drive and a cassette which can be coupled to the drive, and a flexible information recording disc having a solid centering hub guided for rotational movement and arranged in the cassette. The drive comprises a shaft driven by a motor for rotating the disc of the cassette when it is inserted in the drive, a head for writing information on circular information tracks of the rotating disc or for reading information from the tracks, a head moving assembly that directs the head to the information tracks and elements for positioning the cassette. The cassette comprises respective openings for receiving the driving shaft and the writing-reading head, and according to the invention the information recording disc is arranged in such a way in the oblong-shaped cassette body that it nearly touches three side walls thereof or it lies very near to these side walls, and the fourth side wall of the cassette is arranged further away from the disc than the other walls. The opening that receives the head is arranged in a corner region of the lower plate of the cassette that is near the disc, and the assembly in the drive moves the head along a curved path, and the center point of the disc path falls near the longer side wall of the lower plate that defines said corner. All through the head movement path the relative angular position of the head and the information tracks of the disc is constant within a negligible range of tracking error.

By arranging the head receiving opening offset in the direction of the cassette corner instead of the conventional lateral arrangement relative to the center point of the disc, the lateral size of the cassette is reduced. This arrangement changes also the geometry of the head movement which does not occur in a radial direction any more, but along a circular path section in which the angular position of the head gap is substantially constant relative to the tangent line of the information track touching the track in the region of the head gap. By this tracking facility the lateral size of the drive has also been reduced. Because the center point of the path of the head movement falls in the vicinity of a side wall of the cassette, there is a possibility for arranging the head pressing pad in the cassette.

According to a feature of the invention the head pressing pad is arranged in the cassette in that side of the disc which is not used for information recording. By this arrangement the need for maintenance of the drive has been reduced substantially.

The pressing pad can be arranged either in a fixed position relative to the cassette or in a guided manner. In the first case the pressing pad should be arranged just above the path of displacement of the head. In the second case a much smaller pad can be used which should be displaced together with the head along the path of the head movement.

The cassette comprises a lifting plate for the controlled establishment of the head pressure, that is coupled through a bore in the cassette with a lifting rod arranged in the drive and moved preferably by a pulling magnet. The lifting rod thrusts the lifting plate in a position, in which the head pressure is reduced to zero.

According to an other feature of the invention the cassette comprises a cover plate that can be moved against the biasing force of a spring in parallel with the longer side of the cassette, and the cover plate covers the opening for the head insertion and the opening for the insertion of the driving shaft, when the cassette is removed from the drive. In the cassette the cover plate slides directly on the inner surface of the upper or lower plate of the cassette, and its other surface is supported by an internal support plate that comprises respective openings for the head and the driving shaft. A gap is defined in the shorter side-wall of the cassette, in which a rod, arranged in the drive is introduced during insertion of the cassette into the drive, and the rod moves the cover plate against the direction of the insertion, whereby the openings of the cassette will be uncovered. When both sides of the disc is used for information recording, both cassette plates will be associated with a respective cover plate moved by a common rod.

By means of the application of the cover plate the cassette can protect the information recording disc from inadvertent touching and from the effects of dust.

According to an embodiment of the invention the head is mounted in the drive on a head moving arm mounted for turning movement around a shaft, and an end of the arm cooperates with a recess in the rear side wall of the cassette to move the pressing pad in the cassette. At the other end of the head moving arm a nose is arranged that engages a spiral groove defined in a disc rotated by a step motor that controls the head movement.

The head moving arm can be built integrally with a second head supporting plate, so that the two plates embrace the cassette, and the head supporting plate can support a second head or a pressing pad.

The distance between the fulcrum of the head moving arm and the head gap is preferably 1.5 times greaer than the radius of the outermost information track. With such a size relationship, if the head gap closes the same angle with thetangent lines of the outermost and innermost information tracks, than the angular error of the gap position will be acceptable at its maximum at the medium track. When the above ration is chosen to be greater than 1.8 then the tracking error will be still lower.

The information recording apparatus according to the invention provides about the same information recording density and track width as is common in the field of mini-floppy technique, however, its full volume is about half of the modern mini-floppy equipment, and at the same time the cassette offers satisfactory protection for the flexible information recording disc, and in addition to these features, the storage and handling of the present apparatus is simple and it requires minimum maintenance.

Although the information recording disc is formed at its most convenient embodiment as a magnetic recording disc, the invention can not be limited to discs utilizing magnetic type of recording only, but it can well be used in case of discs intended for other recording types, as discs comprising light-sensitive, preferably laser light sensitive surfaces and/or discs recording light reflection interference patterns.

BRIEF DESCRIPTION OF DRAWINGS

FIG. 1 is a simplified perspective view of a mechanism of the apparatus according to the invention for establishing the head pressure;

DESCRIPTION OF THE PREFERRED EMBODIMENTS

Figure 3:
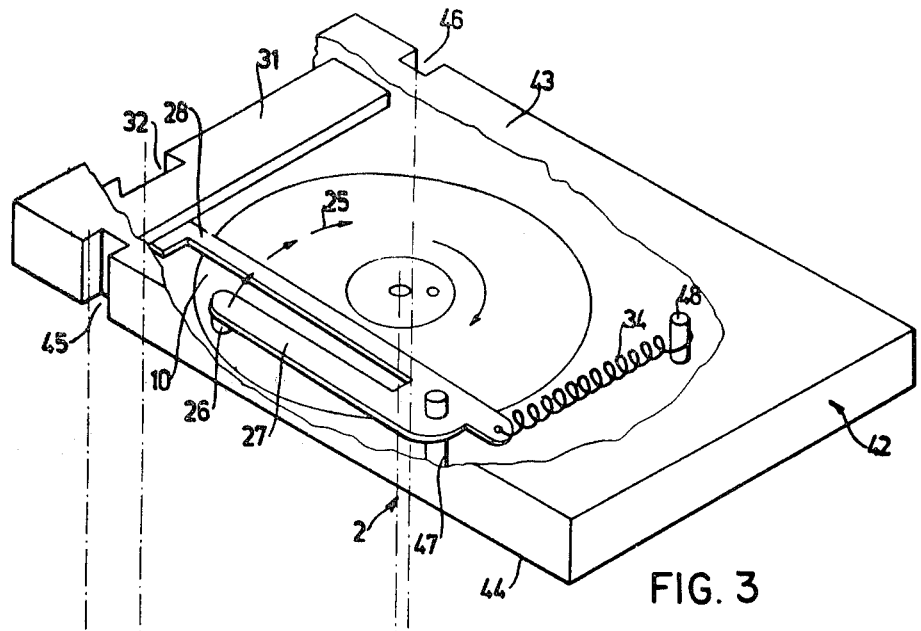
FIG. 3 is a perspective view of an other part of the apparatus shown in FIG. 1 that belongs to the cassette.

FIG. 1 shows a circular flexible information carrying disc 10 and a mechanism adapted to rotate the disc 10 and to move a magnetic head 11 for reading the information recorded on the record disc 10 (or for writing information thereon). For the sake of better illustration FIG. 1 does not show several other elements and certain elements are shown with distorted scale.

The disc 10 comprises a solid central hub 12 defining a central bore engaging a shaft 13 lead therethrough. The shaft 13 is rotated by motor 14. A driving pin 15 rotates together with the shaft 13 and it engages a bore or groove defined in the central hub 12 of the disc 10, whereby the driving pin 15 rotates the disc 10 in the direction of arrow 16 shown in FIG. 1.

The motor 14 and the other constructional elements of the mechanism are mounted on a base plate 17. The writing-reading head 11 is mounted together with a head support fixed on a head moving arm 18. The head moving arm 18 is mounted for turning movement around a shaft 19, and it is moved by a drive disc 20 defining a spiral groove. The disc 20 is turned in a discrete stepwise manner in the direction of arrow 22 by means of predetermined steps of step motor 21 fixed on the bottom side of the base plate 17. The disc 20 defines a spiral guiding groove 24 engaging nose 23 extending downwards from the end of the head moving arm 18, and when the disc 20 is turned, the guiding groove 24 turns the head moving arm 18 around the shaft 19 together with the head support. The path of the head 11 is indicated by arrow 25. The geometrical relationships prevailing during displacment of the head will be described in connection with FIGS. 6 and 7 in detail.

In order that the writing-reading head 11 can read out the information recorded on the disc 10 or it can record information thereon, the head 11 should be pressed with an appropriate pressure to the disc 10. The presence should be provided exactly in the region of the head 11, because of the influence line of the pressure does not coincide with the center line of the head 11, then a torque is generated that tends to bend the disc 10, whereby the accurate fitting between the gap of the head 11 and the surface of the disc 10 will loosen. This decreases the quality of the recording or reading, and in certain cases can render correct operation impossible.

The required pressure is provided by pad 26 made preferably of felt and located on the opposite side of the disc related to the head 11. During displacement of the head 11 a corresponding movement of the pad 26 should be provided, so that the influence line of the pressure force should remain always in the center line of the head 11. The pad 26 is mounted on the end of a leaf spring 27 which is mounted integrally with a moving arm 28 so that it forms a shaft thereof. The moving arm 28 is mounted for rotational displacement around the shaft 19. The required head pressure is provided by the biasing force of the leaf spring 27.

The moving arm 28 is turned by the head moving arm 18. For that purpose a plate 29 extends upwardly from the outer end of the head moving arm 18 normal to the plane of the disc 10, and a slider 30 extends out from the end of the plate 29 facing towards the interior of the assembly. The slider 30 engages a recess 32 defined in the rear edge of a sliding member 31, and during the turning movement of the head moving arm 18 the slider 30 moves the sliding member 31 in the direction of arrow 33. The sliding member 31 is mounted for guided linear movement in the direction of arrow 33 and comprises a pin not shown in FIG. 1 that engages the end of the moving arm 28. The moving arm 28 is biased by spring 34 having an other end fixed to pin 35.

The mechanism described above provides for the rotational movement of the disc 10, for the displacement of the head 11, for the establishment of the head pressure and for the appropriate displacement of the pad 26 that corresponds to the displacement of the head 11.

Figure 2:
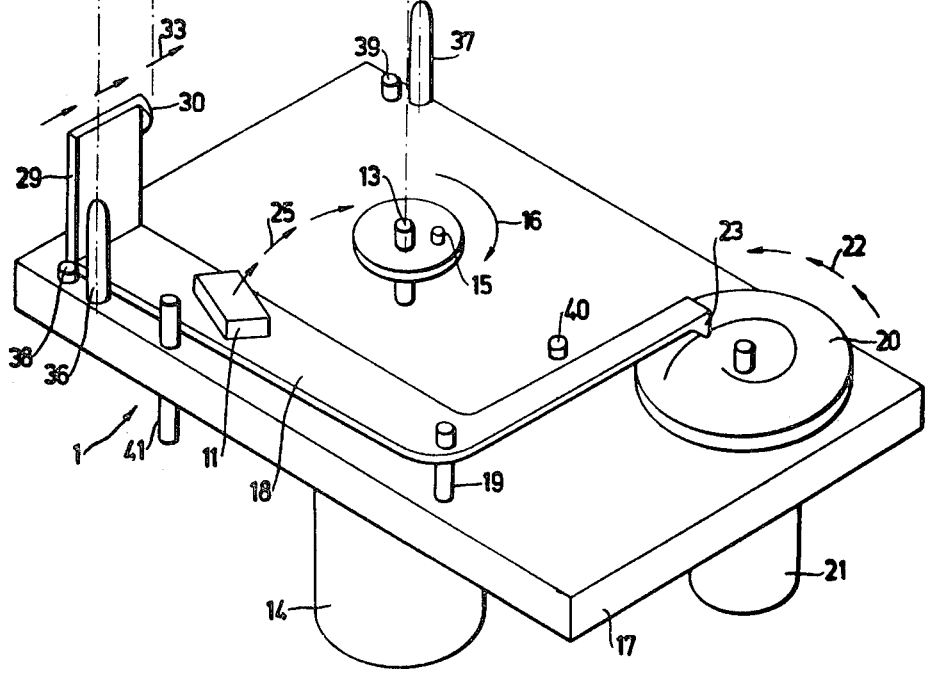
FIG. 2 is a schematic perspective view of a part of the apparatus belonging to the drive.

In FIGS. 2 and 3 the mechanism of FIG. 1 is shown in such a way that is has been divided in two parts corresponding to an actual embodiment thereof. FIG. 2 shows the first part i.e. the drive or drive unit 1 of the apparatus to which a cassette 2 can be attached that forms the other part of the apparatus and is shown in FIG. 3.

The drive 1 shown in FIG. 2 comprises the head 11 with the head support and the head moving arm 18, the motor 14 with the central shaft 13 and the driving pin 15, and the step motor 21 with the disc 20, all being mounted on the base plate 17. For the correct positioning and fixing of the cassette 2 the base plate 17 comprises respective guiding pins 36 and 37 at both sides, and for the accurate abutting of the cassette 2 and for determining its supporting plane the base plate comprises a plurality of abutting bolts 38, 39 and 40 with upper faces lying in a common plane.

The drive 1 comprises bar 41 moved by a magnetic field of a control magnet (not shown in FIG. 2) adapted to control the biasing force of the pad 26 that establishes the head pressure. In the way described in the following parts of the specification, the controlled movement of the bar 41 enables or inhibits the establishment of the head pressure.

FIG. 3 shows the constructional elements belonging to the cassette 2. For the sake of better understanding FIG. 3 shows only those of these elements, that have been described in connection with FIG. 1. The cassette 2 comprises a cassette body 42 made preferably by a shock-resistant, resilient plastic material. The cassette body 42 comprises an upper plate 43 and a lower plate 44. Although in the further figures of the drawing the cassette 2 has been illustrated from various directions, in the following part of the description the terms "upper plate" will always refer to the upper plate 43 and the "lower plate" to the lower plate 44 shown in FIG. 3.

At both sides of the cassette body 42 respective guiding recesses 45 and 46 are defined that engage guiding pins 36 and 37 of the drive 1 and determine the position of the cassette in the horizontal plane.

The guiding mehanism of the pad 26 fully corresponds to the construction shown in FIG. 1, a slight difference lies in that the moving arm 28 can turn around pin 47 fixed to the cassette body 42, and the spring 34 is supported by pin 48 fixed also to the cassette body 42. The axis of the pin 47 defining the center point of the curved path of the pad 26, falls in the extension of the axis of the shaft 19 belonging to the drive 1, or it is only slightly offset from the axis of the shaft 19 so that the pad 26 follows the displacement of the head 11 as it was described earlier.

By the incorporation of the pad 26 and the mechanism for providing the head pressure into the cassette 2, the constructional design and the maintenance of the drive 1 has become remarkably simpler. The wear of the felt material that forms the pad 26 is relatively intensive, therefore in conventional constructions, in which the pad was built in the drive, there was a frequent need for the replacement of the pad. In contrast with such design there will be no need for replacing the pad, if the pad is built in the cassette because the life of the pad is greater than that of the disc. The simple constructional design of the drive comes, among other things from the substantial height reduction occurring due to the fact that there will be no need in the drive any more to establish the head pressure from the opposite side of the information recording disc and to move the pad appropriately.

Figure 4:
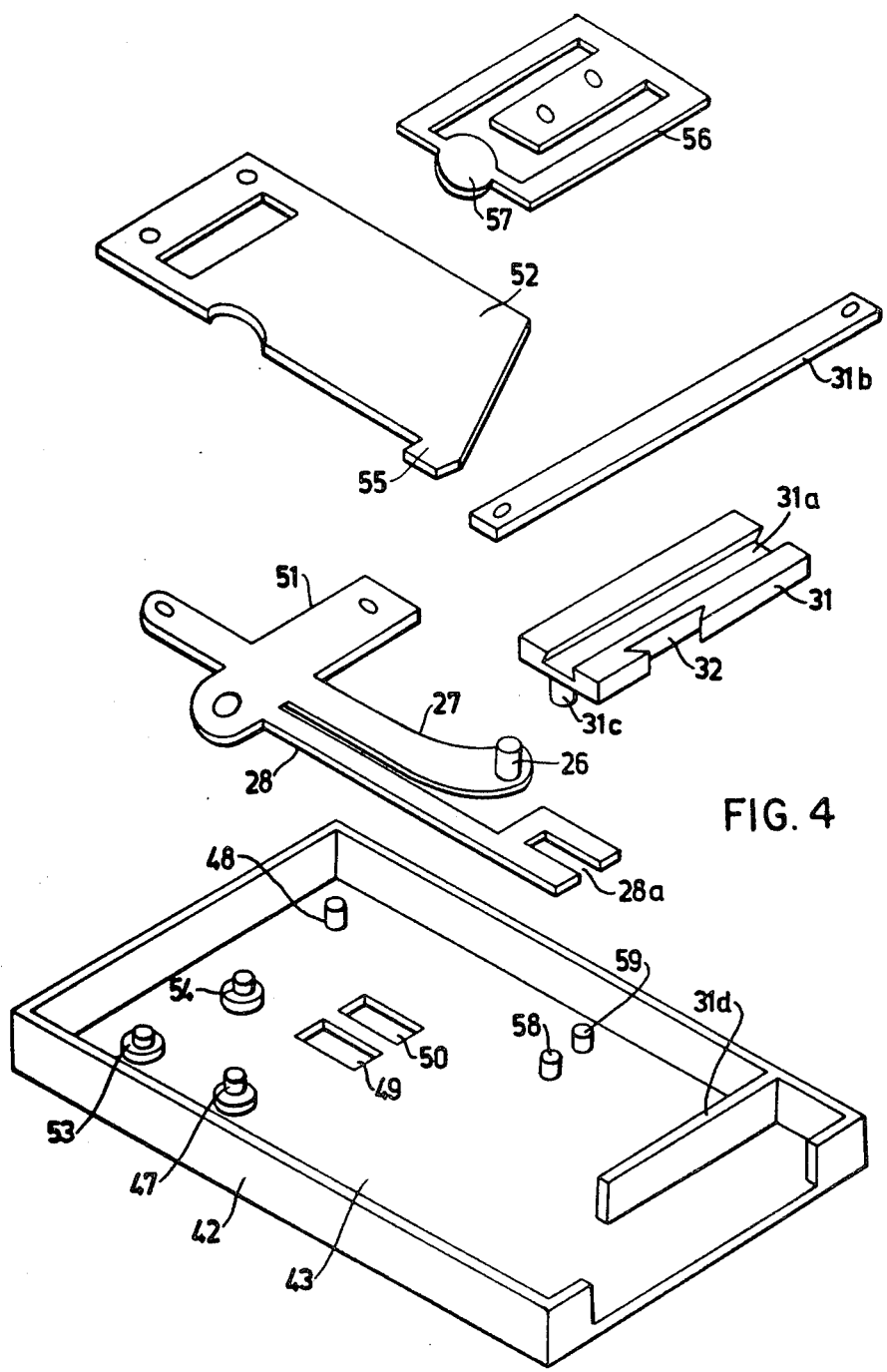
FIG. 4 is an exploded perspective view of the upper part of the cassette shown in FIG. 3.

FIG. 4 shows the constructional design of the upper half of the casette body 42 in an exploded perspective view, in which the vertical downward direction in the drawing corresponds to the upward direction of the cassette. In FIG. 4 the interior design of the upper plate 43 of the cassette body 42 can be seen. The interior of the upper plate 43 is divided in two parts by separation wall 31d. The smaller part is used to receive the sliding member 31 and the guiding elements associated therewith. The sliding member 31 comprises a longitudinal groove 31a into which a guiding rod 31b is fitted. The guiding rod 31b is fixed by pins (not shown in FIG. 4) engaging respective bores tooled into the end portions of the guiding rod 31b. A pulling bolt 31c extends out of the plane of the sliding member 31 that faces the upper plate 43, and the pulling bolt 31c engages a fork 28a made in the end portion of the moving arm 28.

In the cassette body 42 the pin 47 forming a hinge for the moving arm 28 and the pin 48 supporting the spring 34 can be seen. In the upper plate 43 of the cassette body 42 two oblong-shaped windows 49 and 50 can be seen. Behind the window 49 there is located an indicator arm 51 made integrally with and extending out laterally from the side of the moving arm 28, and the surface of the indicator arm 51 that faces towards the window 49 comprises a marking in the form of a coloured dot or a small line section. If the cassette 2 is viewed from above, the marking will be visible through the window 49. The movement of the head is followed by the corresponding turning of the moving arm 28 together with the indicator arm 51, and the position of the marking shows through the window 49, the location of the head 11 relative to the disc 10. The indicator arm 51 can never cover the neighbouring window 50.

The window 50 is used for checking the state of rotation of the disc 10. For that purpose the upper i.e. rear surface of the disc can comprise a spiral marking, and when the cover of the disc 10 is moved below the window 50, a part of the spiral marking will be visible. When the disc is rotating, the line sections visible through the window 50 seem to make a linear movement.

In FIG. 4 a lifting plate 52 is shown, which is made of a resilient material and is located between the moving arm 28 and the disc 10 not shown in FIG. 4. The position of the lifting plate 52 is fixed by pins 53 and 54 extending out from the upper plate 43 of the cassette body 42. At the end of the outer side of the lifting plate 52 a tab 55 extends out from the plate 52, which is located in a completely assembled cassette in the axis of the lifting bar 41 in the drive 1 when the cassette is inserted in the drive. The plane of the lifting plate 52 is bent in such a way that, in a rest condition, it does not block the free movement of the pad 26 mounted on the end of the leaf spring 27 in the direction normal to the plane of the drawing i.e. it does not prevent the pad from pressing the disc 10. When the lifting bar 41 in the drive 1 is in an outwardly extended position, then it extends through a bore made in the cassette body and thrusts the tab 55 towards the upper plate 43, and the corresponding displacement of the lifting plate 52 moves the leaf spring 27 with the pad 26 away from the disc 10, whereby the head pressure is reduced to zero.

In the upper part of FIG. 4 a clamping spring 56 is shown comprising a clamping disc 57 arranged in a position corresponding to that of the solid hub 12 of the disc 10 (FIG. 1). The position of the clamping spring 56 is determined by pins 58 and 59 extending out from the inner side of the upper plate 43 and fitting to corresponding bores in the middle part of the spring. The clamping disc 57 of the spring 56 is bent towards the direction of the disc 10, and when the cassette is assembled, it exerts a constant force on the upper surface of the hub 12 of the disc 10.

Figure 5:
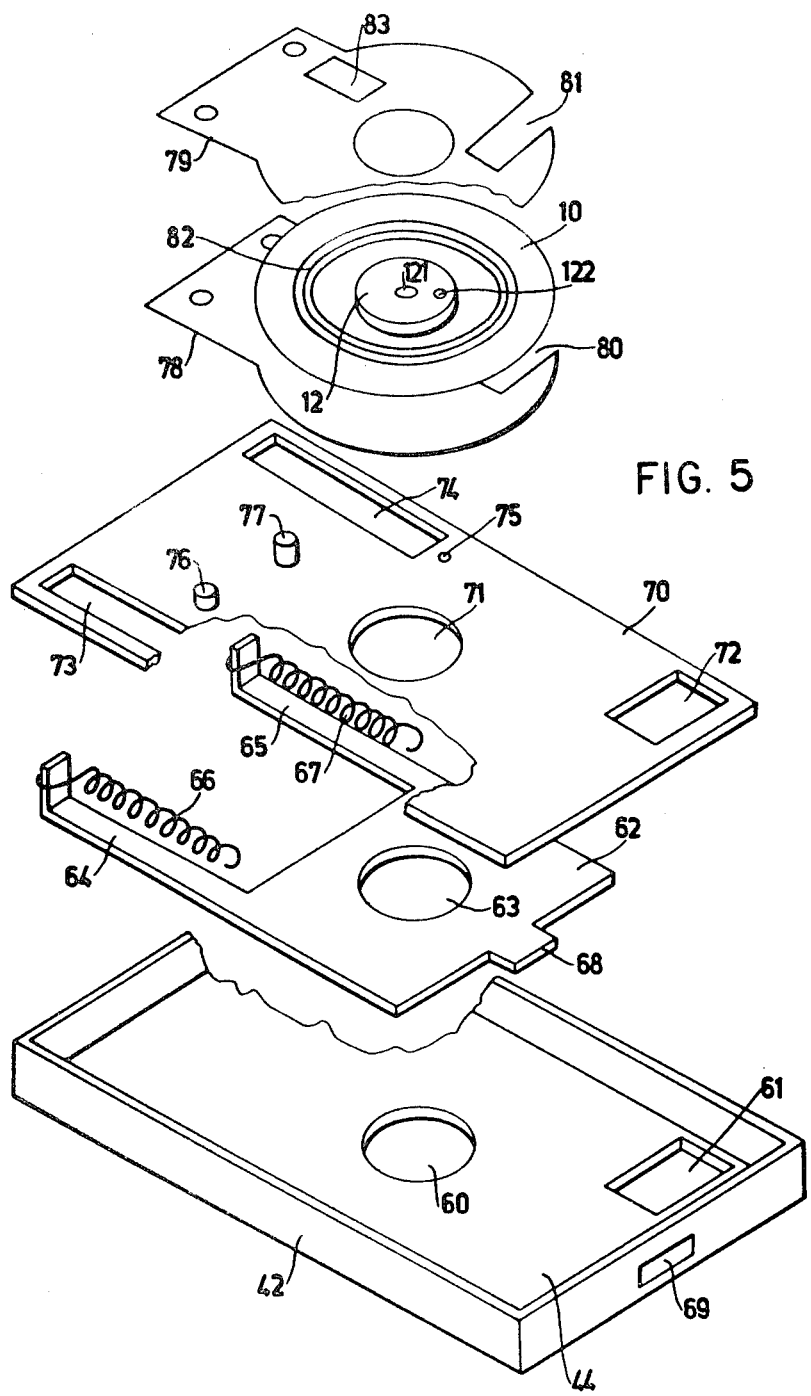
FIG. 5 is an exploded perspective view of the lower part of the cassette shown in FIG. 3.

FIG. 5 shows the constructional design of the lower part of the cassette in an exploded perspective view similar to that of FIG. 4. For the sake of simplicity only the elements required for understanding are shown. This way FIGS. 4 and 5 do not show e.g. various reinforcement ribs and positioning depressions of the cassette.

The base plate 44 of the cassette body 42 defines a circular opening 60 for the introduction of the driving assembly, and the center line of the opening 60 coincides with that of the disc 10. The base plate 44 comprises additionally an oblong-shaped opening 61 through which the head 11 can be inserted and displaced. It can be seen in FIG. 5 that the opening 61 lies in a corner region of the cassette. A cover plate 62 is arranged above the base plate 44 that has a longitudinal size smaller than that of the casette, and the cover plate 62 is guided for free longitudinal movement when the casette is completely assembled. The cover plate 62 defines an opening 63 corresponding to the opening 60, and the opening 63 uncovers the opening 60 in an appropriate position of the cover plate 62. In this position the other opening 61 will also be uncovered, because the right edge of the cover plate 62 falls some distance left of the inner side of the opening 61.

The left hand side the cover plate 62 comprises two extensions 64 and 65, the ends of which are bent in an upright position. These upright ends are pulled by a pair of springs 66 and 67 to the right, whereby the cover plate 62 is biased towards the right wall of the cassette. In the middle region of the right edge of the cover plate 62 a tongue 68 is arranged, and in line with the tongue 68 the side wall of the cassette defines a gap 69. The cover plate 62 abuts the cassette body in such a way, that the tongue 68 can not extend out through the gap 69. The thickness of the tongue 68 is preferably greater than that of the cover plate 62. In the abutted position the cover plate 62 covers the openings 60 and 61 of the base plate 44 of the cassette and this way it protects the interior of the cassette and especially the information recording disc from outer mechanical damage and from the introduction of dust and dirt. The cover plate 62 can be made preferably of a thin metal plate. An internal support plate 70 is arranged above the cover plate 62 that extends through the interior of the cassette in which openings 71 and 72 are defined for the insertion of the driving elements and the head. The openings 71 and 72 are in register with the openings 60 and 61. In the support plate 70 longitudinal slots 73 and 74 are tooled to receive the extensions 64 and 65 of the cover plate 62, and the small helical springs 66 and 67 are located in these slots 73 and 74. The right ends of the springs 66 and 67 are hanged in respective bores defined in the support plate 70. Of these bores FIG. 5 shows bore 75. The support plate 70 comprises pins 76 and 77 adapted to fix the position of covers 78 and 79 that encase the information carrying disc 10.

The central hub 12 of the disc 10 comprises a centering bore 121 and a driving bore 122 (that can also be formed as an arcuate slot). The covers 78 and 79 keep the information recording disc 10 clean and remove static charges from the surface of the disc, and their task and design is similar to that of covers used for conventional mini floppy discs. The covers 78 and 79 comprise central openings that uncover the surface of the hub 12. Furthermore the covers 78 and 79 define respective openings 80 and 81 arranged in regions that correspond to the region of movement of the head 11. The upper surface of the information recording disc 10 comprises an indicator spiral marking 82 which, in accordance with the explanation made in connection with FIG. 4, ensures that the rotational movement of the disc can be checked through the window 50 of the upper plate 43. For that purpose the upper cover 79 comprises a window 83 just below the window 50.

Figure 6:
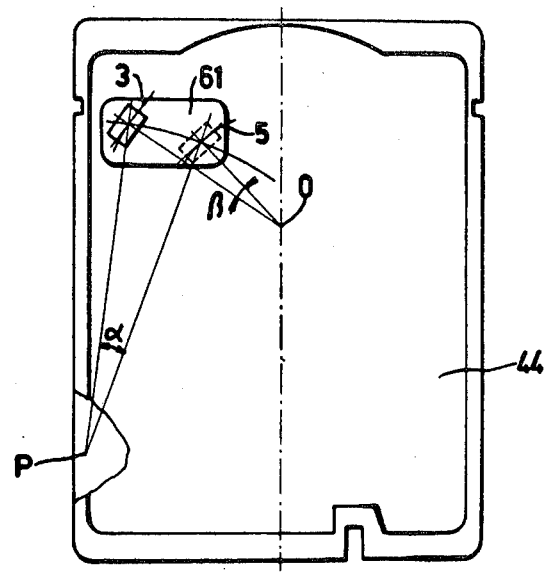
FIG. 6 is a top view of the lower plate of the cassette.
Figure 7:
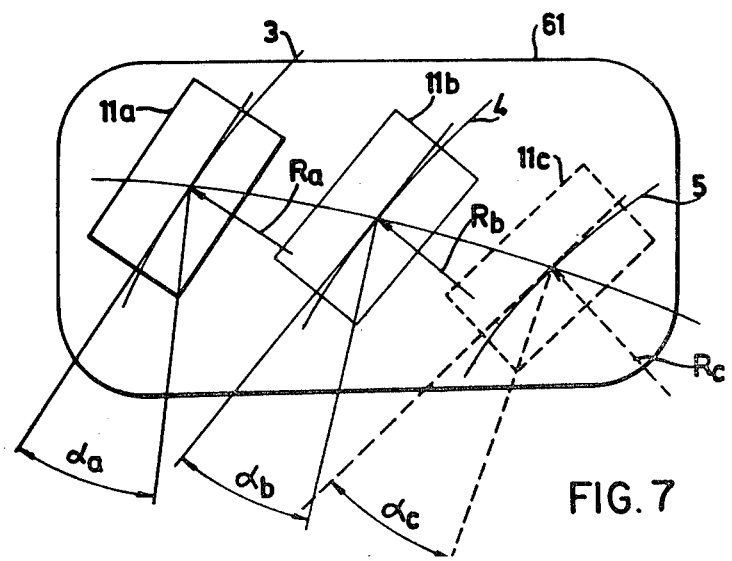
FIG. 7 shows the opening for the head shown in FIG. 6 in an enlarged scale that illustrates various positions of the head.

In FIGS. 6 and 7 the path of the writing-reading head 11 is indicated with the information recording tracks. FIG. 6 shows the top view of the base plate 44 of the cassette, in which of the internal constructional parts only the oblong-shaped opening 61 is illustrated. The scale of FIG. 6 is on a realistic order. In the opening 61 the head 11 is illustrated in positions corresponding to the outermost and innermost tracks 3 and 5 (in the latter case with a dashed line). The information recording tracks are concentric circular paths having a common center point O that falls in the axis of the disc 10. The movement of the head 11 occurs also along a circular path that has a center point P defined by the axis of the shaft 19 (FIG. 1). It can be seen in FIG. 6 that the angle $\alpha$, closed by the radii corresponding to the outermost and innermost positions of the head, is substantially equal to the angle $\beta$ defined between line sections plotted from the center point O to the same extreme head positions. This equality of the angles is the consequence of the specific geometrical arrangement of the center points O and P.

In FIG. 7 the opening 61 is shown in an enlarged scale. The head 11 is illustrated in three positions that correspond to the outermost track 3, the middle track 4 and the innermost track 5, respectively. Between a tangent line of the outermost track 3 plotted in the middle point of the head 11a and the radius $R_a$ plotted to the center point P of the head path a maximum angle $\alpha_a$ can be measured. This angle slightly decreases when the head is turned along its path, and in case of the head 11b in the middle track 4 the angle $\alpha_b$ will have a medium value. With the head 11c in the innermost track 5 the corresponding angle $\alpha_c$ will be at a minimum. Of course, these variations of the angle $\alpha$ are very slight relative to its absolute value. The gap of the writing-reading head that extends in parallel with the shorter side of the oblong-shaped head will lie in the whole head movement range in the extension of the radii $R_a$, $R_b$ and $R_c$ plotted from the center point O.

In case of the geometrical arrangement described above, the angle difference between the head gap and the corresponding radius of the track is at minimum at the two extreme tracks 3 and 5 with a value of 0.1 degree, while this angular difference is at its maximum with a head position in the medium track 4. The maximum angular difference is always smaller than 1 degree. The effect of this angular difference exerts only a negligable influence on the realizable track width.

For illustrating the geometrical conditions the following exemplary values are mentioned that relate to the embodiment shown in FIG. 6: the width of the cassette body 42 is 76 mm and its length is 100 mm. In that case the distance between the center point O and the upper shorter side of the casette is 38 mm and the distance between the centre point P and the same casette side is 82.5 mm. The center point O falls in the central symmetrical line of the cassette and the center point P falls practically in the region of the side wall of the cassette. The size of the opening 61 is $12 \times 23$ mm and the distance between its upper side and the upper cassette wall is 14.7 mm. With such dimensions a track width of 250 $\mu$m will be reduced to 249.96 $\mu$m due to the tracking error mentioned above. The geometrical relations prevailing in systems with a finite radius that track a circular path with minimum tracking error is well known in the art of record players. The application of such relations in the field of information recording in a disc located in a cassette is of substantial importance, because in this way the size of the drive and of the cassette can be reduced effectively, so that only a negligable tracking error is produced. If the opening 61 had been placed in the height of the central point O and if a radial head displacement had been used, then this would have resulted in a substantial increase in the width of the cassette and in that case sufficient room should have been provided in the drive for the head moving mechanism.

By placing the opening 61 in a corner region of the cassette and by using geometrical relationships resulting in a minimum tracking error, in addition to the direct advantages mentioned above, a basis was provided for the application of the earlier described moving mechanism for the head pressing pad. A condition for the establishment of such a construction lies in that the center point of the path of displacement of the pad should substantially coincide with the center point P of the tracking path of the head. It can be seen in FIG. 6 that the center point P falls within the body of the cassette and this is a favourable feature because in this way it has become possible to arrange the fulcrum of the turning movement of the pad (i.e. the pin 47 in FIG. 4) within the cassette.

Figures 8, 9:
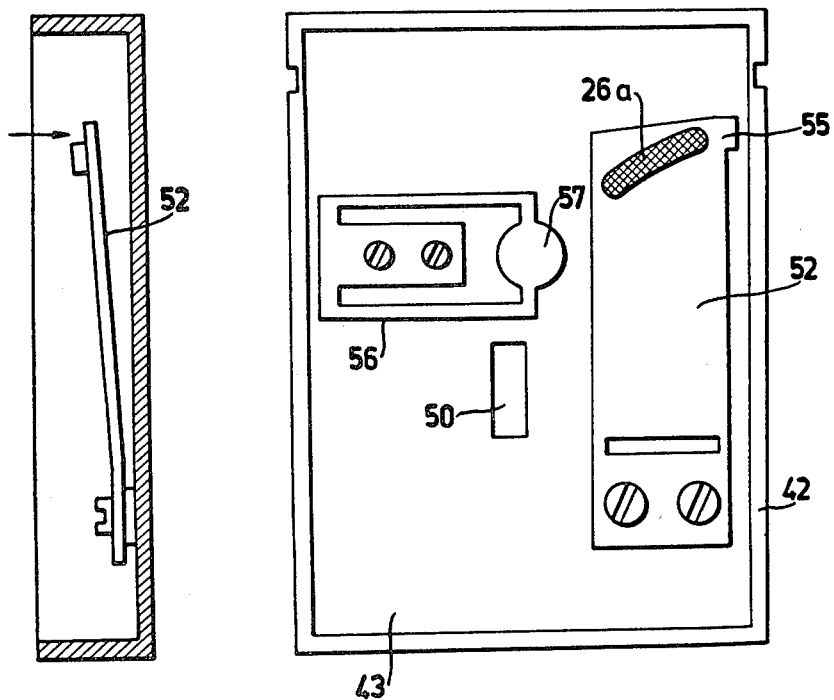
FIG. 8 is an elevational view of the upper part of the cassette in an alternative embodiment that comprises a fixed pressing pad.
FIG. 9 is a side view of FIG. 8 in section.

FIGS. 8 and 9 show an alternative embodiment for establishing the head pressure. FIG. 8 shows the upper part of the cassette body 42 with the upper plate 43. The interior arrangement is rather similar to that shown in FIG. 4, the main difference lies in that the lifting plate 52 holds a special pad 26a that covers the whole path of displacement of the head 11. By this construction all elements used for moving the pad will be superfluous both in the cassette and in the drive. It can be seen in the sectional view of FIG. 9 that the lifting plate 52 that carries the pad 26a is slightly slanted relative to the plane of the upper plate 43 and its resilient biasing force provides the head pressure. The tab 55 cooperates with the lifting rod 41 arranged in the drive (FIG. 2) as it was described earlier, and it enables the controlled establishment of the head pressure. Experimental results have shown that this construction can also provide a head pressure of sufficient quality.

In this embodiment the upper plate 43 comprises only a single window 50, because due to the elimination of the moving arm 28 and of the related mechanisms the indication of the actual position of the head cannot be solved in a simple manner.

Figure 10:
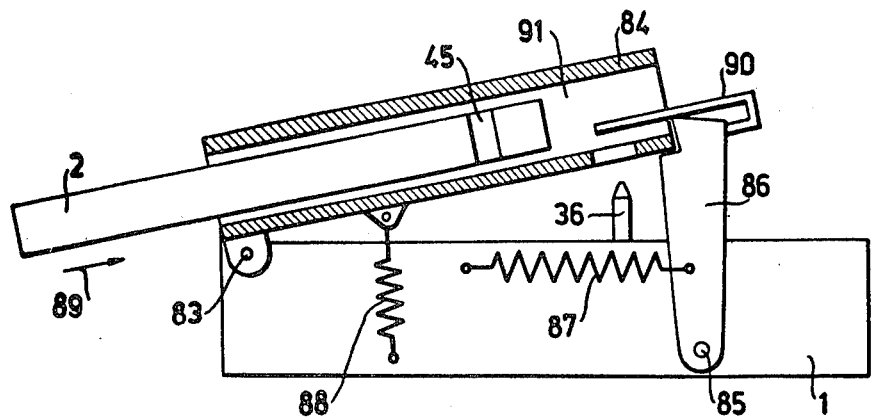
FIG. 10 is a schematic sectional view illustrating the introduction of the cassette into the drive.

Referring now to FIG. 10 that shows that cassette receiving assembly of the drive 1 in a simplified sectional view. A cassette holder 84 can be tilted out from the body 1 around a hinge 83. The tilting movement can be controlled by a lever not shown in the drawing. In the illustrated outer position of the cassette holder 84, this latter is supported by a catch 86 that can be turned around a shaft 85. A spring 87 stresses the catch 86 in forward direction, i.e. towards the cassette receiving opening. An other spring 88 stresses the cassette holder 84 toward the body of the drive 1 but the presence of the catch 86 prevents the cassette holder 84 from being snapped into the body. In this outer position the cassette 2 can be inserted easily into the cassette holder 84 in the direction of arrow 89. A rod 90 is extending through the rear wall of the cassette holder 84 and it extends into the casette receiving room 91 defined in the cassette holder 84. When the cassette 2 is inserted, the end of the rod 90 extends into the gap 69 tooled in the shorter side wall of the cassette (FIG. 6), abuts the tongue 68 of the cover plate 62 and thrusts it backwards opposite to the arrow 89. The length of the rod 90 is chosen in such a way that in the fully inserted position of the cassette the cover plate 62 uncovers the openings 60, 61 and 70, 71. In the last section of the casette insertion movement the cassette abuts the catch 86 and presses it backwards against the biasing force of the spring 87. When the catch 86 is turned backwards, the fastening of the cassette holder 84 is released, and the force of the spring 88 snaps the cassette holder 84 with the inserted cassette 2 into the operational position in the drive 1. The accurate positioning of the cassette is provided by the guiding pins and recesses described already in connection with FIGS. 2 and 3. Of these members FIG. 10 shows the guiding pin 36 and the guiding recess 45. The base plate of the cassette holder 84 defines appropriate openings for the reception of components that extend into the cassette from the drive 1.

Figure 12:
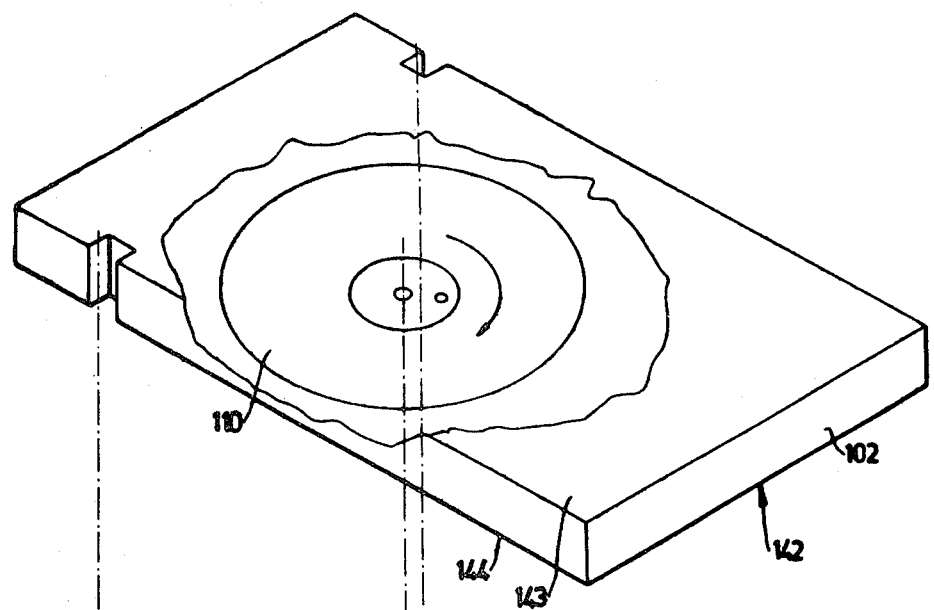
FIG. 12 is a perspective view similar to FIG. 11 illustrating the cassette that can be inserted into the drive.
Figure 11:
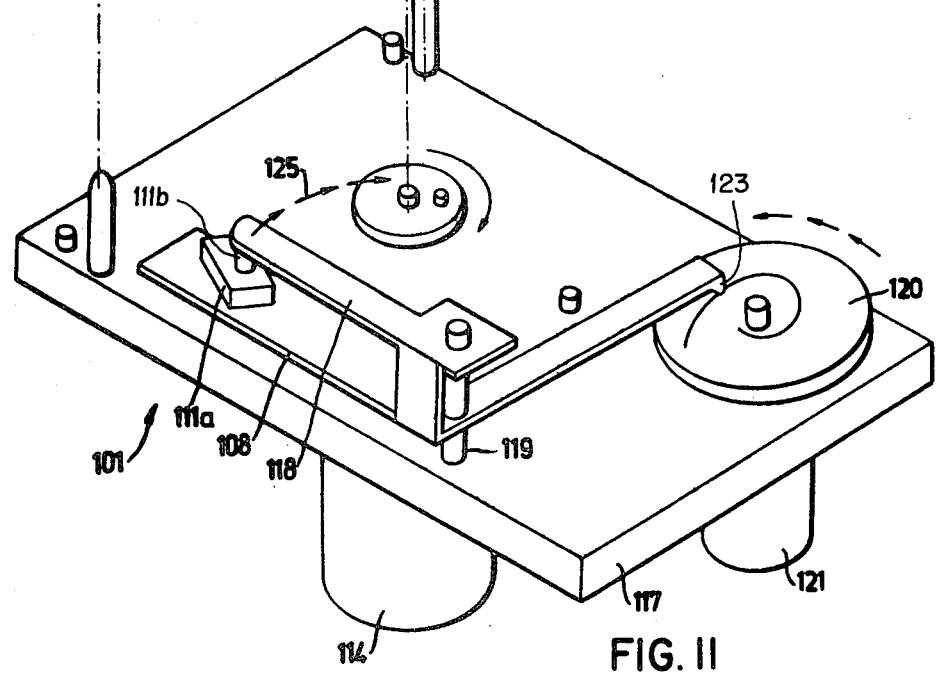
FIG. 11 is a perspective view similar to FIG. 2 illustrating the arrangement of a second writing-reading head or of a pad in the drive.

FIGS. 11 and 12 are similar to FIGS. 2 and 3 and show such an information recording apparatus in which both sides of the flexible information recording disc 10 is used for information recording. Due to the close similarity with the earlier described constructions of the elements shown in FIGS. 11 and 12 only those parts will be explained in detail which are different from those described earlier.

FIG. 11 shows a drive 101 having a constructional base made of base plate 117 that supports motor 114 and step motor 121. The base plate 117 supports a shaft 119 that holds a head moving arm 118 that can be turned around the shaft 119. An upper head support plate 108 is mounted integrally with the head moving arm 118 the plane of which is parallel to the plane of the head moving arm 118. The head moving arm 118 supports a first head 111a and the head support plate 108 supports a second head 111b facing to the lower head 111a. The turning movement of the head moving arm 118 is controlled by a spiral groove defined in a disc 120 fixed on the spindle of the step motor 121 so that the groove receives a nose 123 extending downwards at the end of the head moving arm 118.

In operation the two oppositely facing heads 111a and 111b touch with a predetermined pressure both sides of the disc 110 arranged into the cassette 110, and when the disc 102 is rotated, information can be written on or read out from both sides of the disc. The required head pressure is adjusted by the resilient biasing force of the head support plate 108. In this embodiment there is no need for the application of a pressing pad. In the starting position of the drive 101 shown in FIG. 11 the cassette 102 can be inserted easily into the drive 101 and the insertion can be done e.g. by the embodiment shown in FIG. 10. For the performance of information writing or reading operations the step motor 121 should be operated so that the head moving arm 118 should be turned first in the direction of the arrow 125, whereby the heads reach the range of the required track. A mechanism not shown in FIG. 11 keeps a given distance between the head moving arm 118 and the support plate 108 during the turning movement of the head moving arm 118 until the heads reach the range of the corresponding receiving openings in the cassette. The distance is somewhat greater than the full height of the cassette.

Figure 13:
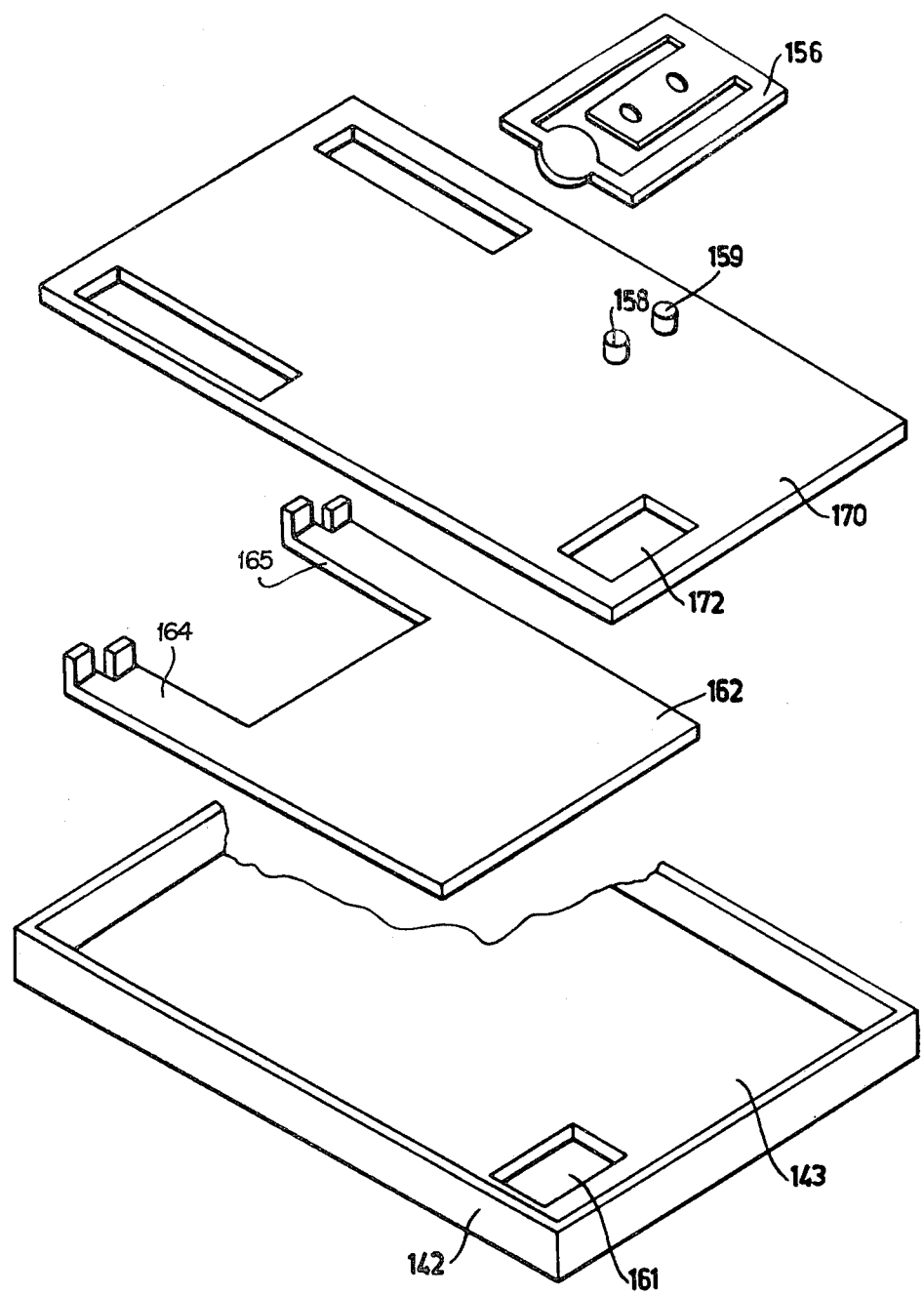
FIG. 13 is an exploded perspective view showing the inner construction of the upper part of the cassette shown in FIG. 12.

FIG. 12 shows the schematic view of the cassette 102. In this embodiment both the lower and upper plates 144 and 143 comprise respective openings for the introduction of the heads 111a and 111b. The elements arranged on the lower plate 144 i.e. in the lower part of the cassette body 142 are substantially as shown in FIG. 5. The design of the upper part of the cassette body 142 will be similar to this design, and this is illustrated in FIG. 13. The upper part of the casette shown in FIG. 13 comprises three main parts: the upper part of the cassette housing including the upper plate 143, a cover plate 162 and an internal support plate 170. The upper plate 143 defines an opening 161 and the internal support plate 170 defines an opening 172, and the upper head 111b extends through the openings 161 and 172 to the upper side of the disc 110 in the rear position of the cover plate 162. Two extensions 164 and 165 of the cover plate have a pair of downwardly bent tabs, respectively, and the tabs are sufficiently long to embrace the corresponding upwardly extending tabs made at the ends of the cover plate 62 in the lower half of the casette. Owing to this construction the cover plates 62 and 162 slide simultaneously when the cassette 102 is inserted into the drive, and this way the openings for both of the heads 111a and 111b will be uncovered. The information recording disc is biased by a clamping spring 156 fixed by pins 158 and 159, just as it is shown in FIG. 4.

By using the constructional design shown in FIGS. 11, 12 and 13 an alternative embodiment can be devised, in which the head support plate 108 supports a pressing pad made of felt (not shown in the drawing) instead of the second head 111b. In that case only one side of the disc can be utilized for information recording.

I claim:

1. An information recording apparatus comprising:
    a cassette (2) having a lower plate (44), a first and a second long side wall, and a first and a second short side wall, said side walls all connected to said lower plate and defining a record disc space, said lower plate having a drive shaft opening (60) including a first center point and a head opening (61) adjacent a corner of said lower plate where said first long and first short walls meet;
    an information record disc (10) having a central hub (12) and plurality of circular information tracts, said record disc rotatably mounted in said record disc space about said first center point (0), said record disc having a diameter and said first center point position so that said record disc is spaced closely from said first and said second long side walls, and said first short side wall, and spaced farther from said second side wall, said tracks positioned to be accessible from said head opening; and a drive unit (1) couplable with said cassettes and having a drive shaft (13), (15) for engaging with said hub (12), motor means (14) connected to said drive shaft for rotating said drive shaft and record disc in said cassette with said cassette coupled to said drive unit, a head for engaging with one of said information tracks for at least one of recording and reading information, and head moving means for moving said head across said head opening in a curved path having a center of rotation at a second center point adjacent said first long side wall and spaced from said head opening with said cassette coupled with said drive unit so that a relative angle between said head and each track is substantially constant within a small track error throughout said curved path.

2. An apparatus according to claim 1 wherein said record disc has a circular outer flexible part for carrying said information tracks, said central hub being solid and connected to a center of said circular part.

3. An apparatus according to claim 2, wherein said flexible part of said disc, on a side thereof facing away from said lower plate includes a spiral marking (82), said cassette including an upper plate connected to said side walls for closing said record disc space, said upper plate (43) including a window (50) positioned so that said spiral marking can be viewed from outside said record disc space.

4. An apparatus according to claim 2, wherein said cassette includes an upper plate (43) connected to said side walls for closing said record disc space, a clamping spring (56) connected to said upper plate and extending in said record disc space, said clamping spring including a clamping disc (57) engaging said hub (12) for biasing said hub and said record disc toward said lower plate.

5. An apparatus according to claim 1, including a pressing pad (26) connected to said cassette and disposed in said record disc space, said pad being arranged on a side of said record disc opposite said head opening and in at least a portion of said curved path of movement of said head when said cassette is coupled with said drive unit for engaging said record disc to press said record disc for said head.

6. An apparatus according to claim 5 including a moving arm (28) pivotally mounted to said cassette in said record disc space, a leaf spring (27) formed as an integral part of said moving arm, said pressing pad connected to said leaf spring, a center of pivoting of said moving arm being adjacent said second center point with said cassette coupled to said drive unit.

7. An apparatus according to claim 6, when said cassette includes an upper plate (43) connected to said first and second long side walls and said first and second short side walls, a moving arm pin (47) connected to said upper plate and extending into said record disc, said moving arm pivotally mounted to said moving arm pin, a sliding member (31) slidably mounted in said record disc space and engaged with said moving arm, and a first biasing spring connected between said cassette and said moving arm for biasing said moving arm into a first position about said moving arm pin.

8. An apparatus according to claim 7, wherein said head moving means comprises a head arm (18) pivotally mounted to said drive unit for rotation about said second center point, said head connected to said head arm, said head arm having a bent plate portion (29) engaged with said sliding member so that head arm and moving arm pivot substantially together.

9. An apparatus according to claim 8, wherein said sliding member includes a recess (32), said plate portion (29) including a slider (30) extending therefrom and extending into said recess when said cassette is engaged with said driving unit.

10. An apparatus according to claim 9 including a partition wall (31d) connected to said upper plate and defining a sliding member space for accommodating said sliding member (31), said sliding member including a pulling bolt (31c) and having a longitudinal groove (31a) defined therein, a guide rod (31b) connected to said cassette and disposed in said longitudinal groove for guiding said sliding member in said sliding member space, said moving arm comprising a fork (28a) engaged around said pulling bolt.

11. An apparatus according to claim 6, wherein said moving arm includes an indicator arm portion (51) having markings thereon, said cassette including an upper plate connected to said first and second long side walls and said first and second short side walls for closing said record disc space, said upper plate (43) having a window (49) for viewing said indicator arm markings.

12. An apparatus according to claim 5, wherein said cassette includes an upper plate (43) connected to said long side and short side walls for closing said record disc space, a lifting plate (52) mounted in said record disc space adjacent said upper plate, said lifting plate made of resilient material and being bent slightly into said record disc space, said lifting plate including a laterally extending tab (55), said drive unit (1) including a lifting bar (41) having an adjustable position so that when said cassette is coupled with said drive unit, said lifting bar cooperates with said main gauge with said tab to lift said lifting plate, said cassette including an opening for receiving said lifting bar.

13. An apparatus according to claim 12, wherein said lifting plate is disposed in said record disc space on a side of said moving arm which is opposite to said upper plate.

14. An apparatus according to claim 5, including a lifting plate (52) connected to said pressing pad (26a), said pressing pad extending across said curved path with said cassette coupled to said drive unit.

15. An apparatus according to claim 1 including a cover plate (62), (162) slidably mounted in said record disc space between said record disc and said lower plate, said cover plate shaped to cover said drive shaft opening (60) and said head opening (61) of said lower plate in a first position of said cover plate and to uncover said drive shaft opening and said head opening in a second position, biasing means connected to said cover plate for biasing said cover plate toward said first position thereof, at least one of said side walls including a gap (69) for permitting access to said cover plate, said drive unit including a rod (90) extending into said gap when said cassette is coupled with said drive unit for sliding said cover plate against said biasing means to move said cover plate into said second position thereof for uncovering said drive shaft opening and said head opening.

16. An apparatus according to claim 15, wherein said cover plate comprises a tongue (68) adjacent said gap with said cover plate in its first position.

17. An apparatus according to claim 1, wherein said drive unit includes a base plate (17), a supporting shaft (19) connected to said base plate and disposed at said second center point (P), said head moving means comprising a head moving arm (18) pivotally mounted to said supporting shaft and connected to said head for supporting said head (11), said head moving arm including an outwardly extending arm portion having a nose (23), and drive means engaged with said nose for pivoting said head moving arm about said supporting shaft for moving said head in said curved path.

18. An apparatus according to claim 15, including an internal support plate (70, 71) disposes in said record disc space of said cassette, fixed to said cassette and arranged on a side of said cover plate opposite said lower plate, said support plate including a first opening in registration with said drive shaft opening and a second opening in registration with said head opening, and functional to support said record disc.

19. An apparatus according to claim 18, wherein said cover plate includes a pair of extensions (64,65) each including a bent end portion, said support plate including a pair of slots (73,74) each for receiving one of said bent end portions to guide a relative sliding between said cover plate and said support plate, and a pair of springs (66,67) connected between said bent end portions and said cover plate forming said biasing means for biasing said cover plate into its first position.

20. An apparatus according to claim 17, wherein said drive means comprises a drive disc (20) rotatably mounted to said base plate and a step motor (21) connected to said drive disc for rotating said drive disc in stepwise fashion for moving said head along said curved path from one track to another, said drive disc including a spiral guide groove (24), said nose (23) engaged in said spiral guide groove.

21. An apparatus according to claim 17, wherein said head moving arm (118) includes a head support plate (108) for supporting said head (111a), a further head moving arm portion (118) positioned above said head support plate, a second head (111b) connected to said further head moving arm and positioned adjacent said first mentioned head (111a).

22. An apparatus according to claim 17, including a plurality of supporting guide pins (136,137) connected to said base plate, said cassette including a plurality of recesses (45,46) for receiving said support guide pins, and a plurality of abutting bolts (38,39,40) connected to said base plate for engaging said lower plate (44) of said cassette with said cassette coupled to said drive unit.

23. An apparatus according to claim 17, wherein a distance between said support shaft (19) and said head (11) is at least 1.5 times greater than a radius of an outer most one of said tracks (3) on said record disc (10).

24. An apparatus according to claim 1, wherein said drive unit includes a cassette holder (84) defining a space for receiving said cassette, a base plate, hinge means (83) pivotally mounting said cassette holder to said base plate, a catch (86) pivotally mounted to said base plate and engageable with said cassette holder for holding said cassette holder at a raised position, a spring connected between said base and said catch for biasing said catch against said cassette holder and a further spring connected between said holder and said base for biasing said holder toward said base to couple said cassette when disposed in said cassette holder with said drive unit.

* * * * *